(12) United States Patent
Yeum et al.

(10) Patent No.: US 8,256,811 B2
(45) Date of Patent: Sep. 4, 2012

(54) DOOR GRIPPER FOR A VEHICLE AND MANUFACTURING METHODS USING SUCH A DOOR GRIPPER

(75) Inventors: Jung Whan Yeum, Seoul (KR); Doo Il Hwang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 90 days.

(21) Appl. No.: 12/841,619

(22) Filed: Jul. 22, 2010

(65) Prior Publication Data
US 2011/0133501 A1 Jun. 9, 2011

(30) Foreign Application Priority Data
Dec. 4, 2009 (KR) ................ 10-2009-0120094

(51) Int. Cl.
*B66C 1/42* (2006.01)
(52) U.S. Cl. ............................ 294/86.4; 269/905
(58) Field of Classification Search ............... 294/86.4, 294/197, 198; 269/32, 45, 905; 29/281.1; 414/684.3, 729, 740, 741; 901/30, 37
See application file for complete search history.

(56) References Cited

U.S. PATENT DOCUMENTS

| | | | | |
|---|---|---|---|---|
| 4,552,397 A | * | 11/1985 | Conrad | 294/86.4 |
| 4,589,199 A | * | 5/1986 | Ohtaki et al. | 29/714 |
| 4,932,639 A | * | 6/1990 | Fjellstrom | 269/17 |
| 4,961,257 A | * | 10/1990 | Sakamoto et al. | 29/823 |
| 5,181,307 A | * | 1/1993 | Kitahama et al. | 29/434 |

* cited by examiner

*Primary Examiner* — Dean Kramer
*Assistant Examiner* — Stephen Vu
(74) *Attorney, Agent, or Firm* — Edwards Wildman Palmer LLP; Peter F. Corless

(57) ABSTRACT

Featured is a door gripper for a vehicle including a frame, upper clamping units and a lower clamping unit. The lower clamping unit including a rotary pad with a swivel ball in restricted surfaces of a clamper and a locator of a lower clamping unit to deal with an angle difference of restricted cross sections of the door. The lower clamping unit and upper clamping units being configured and arranged so as to be movable in the up-down direction and the width direction along a guide rail of the frame in order to deal with differences in height and width of the restricted cross section.

13 Claims, 10 Drawing Sheets

PRIOR ART

PRIOR ART

DOOR GRIPPER FOR A VEHICLE AND MANUFACTURING METHODS USING SUCH A DOOR GRIPPER

CROSS-REFERENCE TO RELATED APPLICATION

This application claims priority to and the benefit of Korean Patent Application No. 10-2009-0120094 filed in the Korean Intellectual Property Office on Dec. 4, 2009, the entire contents of which are incorporated herein by reference.

BACKGROUND OF THE INVENTION (a) Field of the Invention

The present invention relates to a door gripper used during manufacturing of a vehicle. More particularly, the present invention relates to a door gripper for a vehicle which is configured to correspond to an angle difference of restricted cross sections and height and width differences of restricted cross sections of a door of a vehicle to be applied to a various types of doors. The present invention also relates to methods of manufacturing a vehicle using a door gripper.

(b) Description of the Related Art

Grippers are typically mounted at the end of an arm 3 of a robot 1 used in the manufacturing process, such as for example the gripper 5 shown in FIG. 1. Such a gripper is used to carry vehicle body parts from one manufacturing process to the next manufacturing process of the vehicle assembly line or to fix the vehicle body parts for welding by a welder in the vehicle body assembly line. Such a gripper also is typically called a robot gripper.

In FIG. 1, reference numeral "7" indicates a welder and reference numeral "9" indicates a door, which is a part of a vehicle body.

There is shown in FIG. 2 a conventional door gripper 5. Such a door gripper 5 includes four exclusive clamping units 13 and a variable clamping unit 17 provided with two sliding cylinders 15 on a frame mounted at the end of the arm 3 of the robot 1.

When using such a conventional door gripper 5, when (a) the angle or height of restricted cross sections of vehicle parts is different, or (b) the shape of the restricted cross section is complicated for each vehicle, or (c) to prevent interference with the existing equipment, one uses the sliding cylinder 15 with the variable clamping unit 17 to handle one or more of these concerns. However, when these concerns cannot be addressed for new types of vehicles, even by using the variable clamping unit 17 and the sliding cylinder 15, an entire new gripper is manufactured for the new types of vehicles.

Consequently, when an exclusive gripper is provided for new types of vehicles, the investment cost is increased because of the additional cost for either modifying an existing gripper or manufacturing a new gripper. In addition to the added cost, the structure of the gripper becomes gradually more complicated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention features a door gripper for a vehicle which is particularly advantageous because it is adaptable for use with various types of vehicles. Such a door gripper includes a lower clamping unit and upper clamping units, where a rotary pad with a swivel ball is provided in restricted surfaces of a clamper and a locator of the lower clamping unit to deal with an angle difference of restricted cross sections of the door of a vehicle. The lower clamping unit and upper clamping units are disposed so as to be movable in the up-down direction and the width direction along a guide rail on a frame by electric cylinders in order to deal with differences in height and width of the restricted cross section.

In one embodiment of the present invention there is featured a door gripper for a vehicle, which includes: a frame having a tool mounting portion at the center of the rear side to mount to a tool changer of a robot, upper clamping units and a lower clamping unit. The upper clamping units are mounted by transverse sliding plates on a transverse guide rail provided transversely at the upper portion of the frame to be transversely slidable by transverse electric cylinders, respectively, and having upper clampers restricting clamping points at both sides of the upper portion of a door with respect to an upper locator, when upper clamping cylinders operate. The lower clamping unit has a longitudinal sliding plate to be movable up/down by a longitudinal electric cylinder disposed longitudinally at the lower portion of the frame, moved forward/rearward by an air brake on the longitudinal sliding plate, and restricting one side of the lower portion of the door with respect to the lower locator by driving the lower clamping cylinder, using a lower clamper.

In further embodiments, the upper clamping units include: a transverse guide rail transversely disposed at the upper portion of the frame; transverse sliding plates slidably disposed at one side and the other side of the transverse guide rail; transverse electric cylinders transversely disposed at the upper portion of the frame above and under the transverse guide rail and having operating rods of which the ends are connected to extending ends of the transverse sliding plates; upper locators disposed forward at the transverse sliding plates; upper clamping cylinders disposed in the front-rear direction at the upper portions of the upper locators and having the rear ends hinged to the upper locators; and upper clampers having sides hinged to the ends of the upper locators and the other sides hinged to the end of the rod of the upper clamping cylinders.

In such a configuration, the ends of the operating rods of the transverse electric cylinders are connected to the extending ends of the transverse sliding plates by floating joints.

In yet further embodiments, the upper clamping cylinders are hydraulic cylinders operated by a fluid and in more particular embodiments, the upper clamping cylinders are pneumatic cylinders that use compressed air as the operational pressure.

In yet further embodiments, the lower clamping unit includes: a longitudinal electric cylinder disposed longitudinally at the lower center portion of the frame; a longitudinal sliding plate connected with the operating cylinder of the longitudinal electric cylinder to be guided up/down along the cylinder case; an air brake disposed in the front-rear direction on the longitudinal sliding plate; a sliding block disposed slidably along a front-rear guide rail on the longitudinal sliding plate and having the rear side connected to an operating rod of the air brake; a lower locator mounted to the front of the sliding block to be movable forward/rearward with the sliding block; a lower clamping cylinder disposed in the front-rear direction above the lower locator and having one side is hinged to the lower locator; and a lower clamper having one side hinged to the end of the lower locator and the other side hinged to the end of the rod of the lower clamping cylinder. In alternative embodiments, an indexing electric motor as is known to those skilled in the art is used as the electric cylinder.

In further embodiments, the lower clamping cylinder is a hydraulic cylinder operated by a fluid and in more particular embodiments, the upper clamping cylinders is a pneumatic cylinder that uses compressed air or other gas as the operational pressure.

In further embodiments, the lower clamping unit includes a spring that is positioned so as provide an elastic force to the sliding block towards the front and is disposed on an operating rod of the air brake.

In yet further embodiments, lower clamping unit includes a rotary pad with a swivel ball that is rotatable within a predetermined range of angles and that is provided in restricted surfaces of the lower clamper and the lower locator.

In further embodiments, it is preferable that the predetermined range of angles is 12°.

According to a door gripper for a vehicle of the present invention, as described above, it can be applied to various types of vehicles by (a) having a rotary pad with a swivel ball that is provided in restricted surfaces of a clamper and a locator of a lower clamping unit to deal with an angle difference of restricted cross sections of the door of a vehicle, and (b) disposing a lower clamping unit and upper clamping units so as to be movable in the up-down direction and the width direction along a guide rail on a frame by electric cylinders in order to deal with differences in height and width of the restricted cross section.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein.

DETAILED DESCRIPTION OF THE EMBODIMENTS

Figure 1:
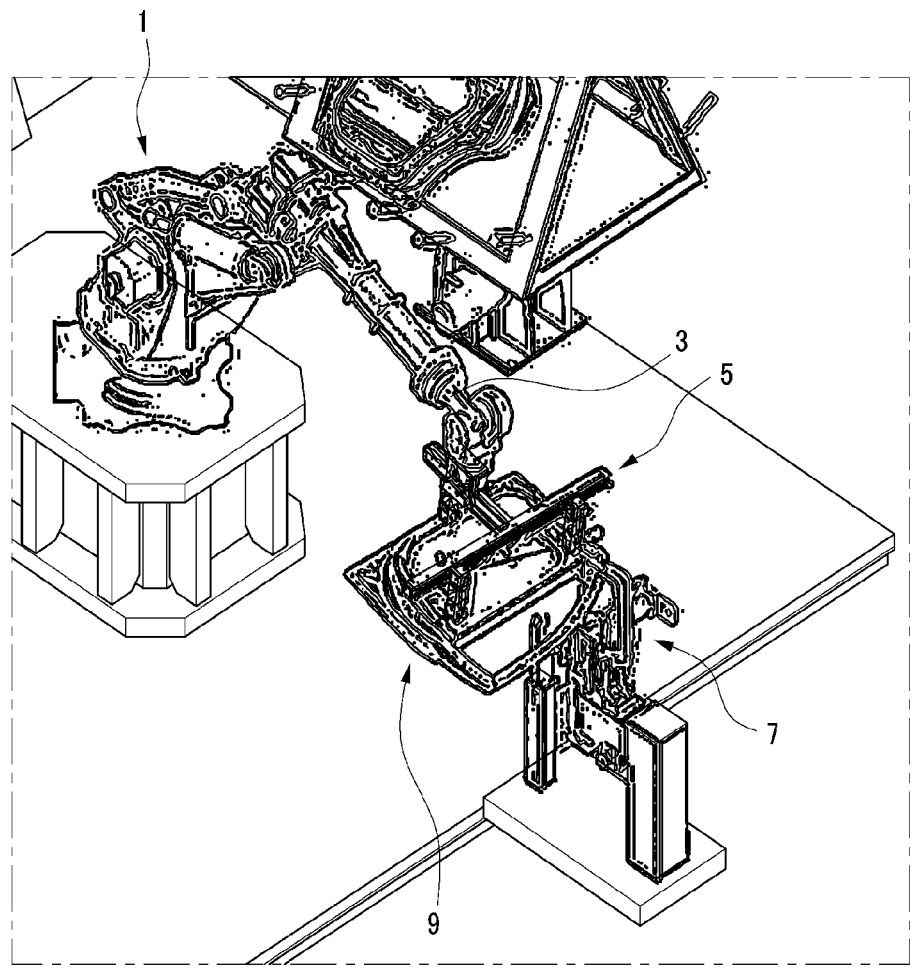
FIG. 1 is an illustrative view showing a door welding process using a conventional common door gripper.
Figure 2:
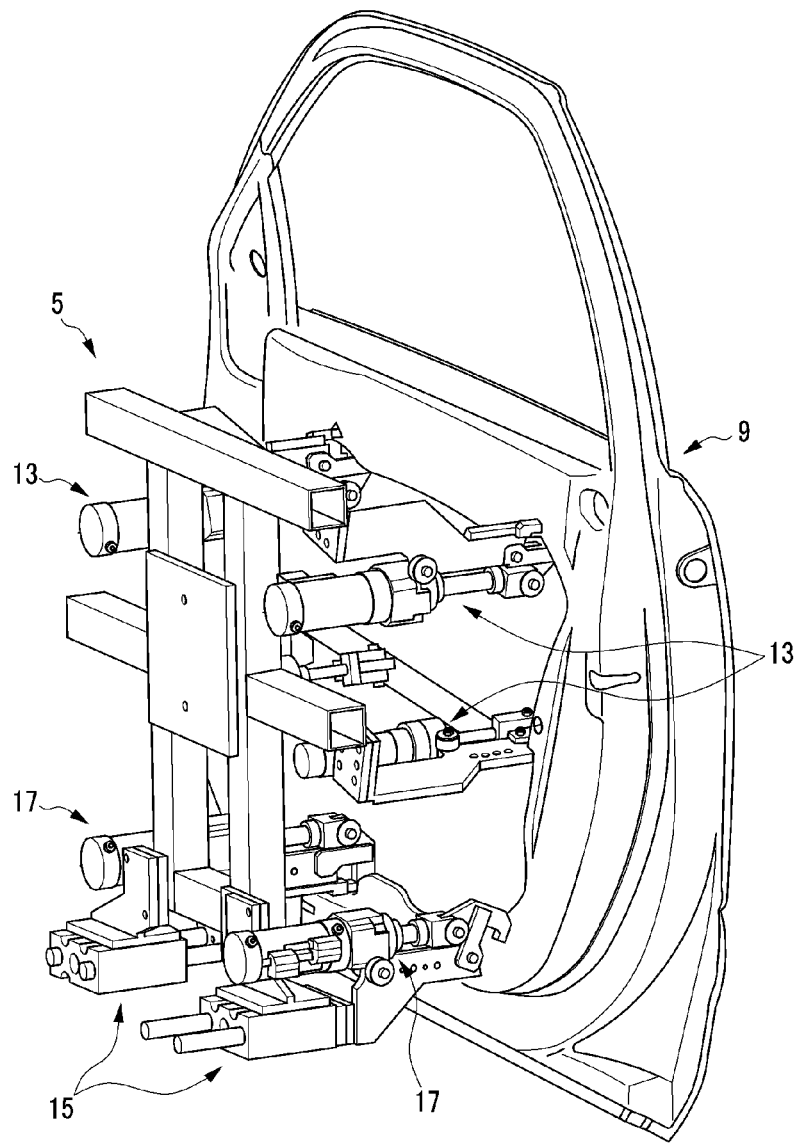
FIG. 2 is an illustrative view showing the use of another conventional door gripper.

As described further herein, the present invention features a door gripper for a vehicle, more particularly a door dripper that is used in the manufacturing of such a vehicle. Such a door gripper includes a frame, at least one upper clamping unit that is movably coupled to the frame so an end point thereof is movable transversely with respect to the frame. In further embodiments, such a door gripper includes a plurality of such upper clamping units. Each of the at least one upper clamping unit or the plurality of upper clamping units includes at least one upper clamper and an upper locator, the at least one clamper restricting clamping points at a corresponding upper portion of a door with respect to the upper locator.

The at least one lower clamping unit is movable coupled to the frame so an end point thereof is movable at least one of back and forth in a first direction or back and forth in a second direction. The at least one lower clamping unit includes at least one lower clamper and a lower locator, the at least one clamper restricting a clamping point at a corresponding lower portion of a door with respect to the lower locator.

In further embodiments, the door gripper includes a plurality of upper clamping units and a single lower clamping unit and where the clamping points are arranged so as to be locate at apexes of a triangle. In yet further embodiments, the lower clamping point is disposed between the two upper clamping points.

In further embodiments, the frame for such a door gripper includes a mounting portion that is configured and arranged to mount a tool changer of a robot. In this way, the robot can position or localize the door gripper proximal the rear side of the door so that the clampers of the upper and lower clamping units can be moved so as to engage the respective corresponding clamping point of the door.

In yet further embodiments, the frame includes a transverse guide rail provided transversely at the upper portion of the frame and the upper clamping unit includes at least one transverse sliding plate, at least one transverse moving device, and a least one clamper actuation device. In the case where there are a plurality of upper clamping units, there is provided a plurality of transverse sliding plates and a plurality of transverse moving devices, one plate and moving device associated with each clamping unit.

Each of the transverse sliding plates is mounted on the transverse guide rail and configured so as to be transversely slidable by the at least one transverse moving device. In this way, each of the at least one clamping unit or the plurality of clamping units can be moved transversely by the respective plate and moving device.

In further embodiments, the at least one clamper actuation device is operably coupled to the at least one clamper. The actuation device is configured so as to cause the clamper to engage the door at a corresponding clamping point when restricting the clamping point.

In yet further embodiments, the lower clamping unit includes a longitudinal sliding plate, a longitudinal moving device that is disposed longitudinally at a lower portion of the frame, an air brake on the longitudinal sliding plate, and a lower clamper actuation device. The longitudinal sliding plate is movable back and forth in the first direction (e.g., in an up and down direction) by the longitudinal moving device and the clamper is moved back and forth in a second direction (e.g., forward/reward direction) by the air brake on the longitudinal sliding plate. Also, the lower clamper actuation device is operably coupled to the lower clamper and being configured and arranged so as to restrict one side of the lower portion of the door with respect to the lower locator by using the lower clamper.

In yet further embodiments, the at least one lower clamping unit includes a rotary pad with a swivel ball rotatable within a predetermined range of angle. The rotary pad is provided in restricted surfaces of the lower clamper and the lower locator.

In other aspects of the present invention, there also is featured a method for manufacturing a vehicle including the steps of providing a door clamper as herein described and positioning the door gripper to proximal the rear side of the door.

In further embodiments, such a manufacturing method further includes operating the door gripper so one of: (a) that the lower clamper clamps to a lower clamping point of the door (b) that the at least one upper clamper is clamped to a corresponding clamping point of the door; and to restrict an upper portion and a lower portion of the door respectively to the at least one upper and lower clamping units.

Figure 3:
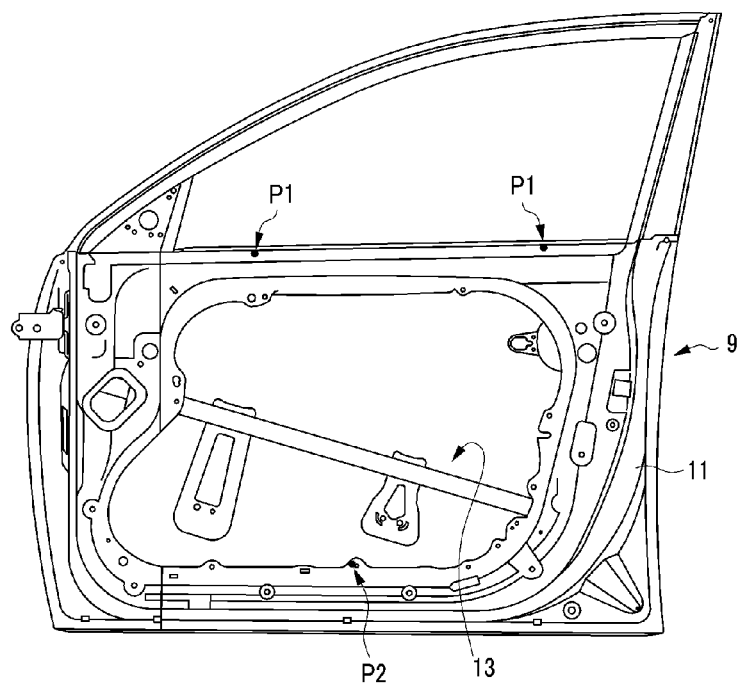
FIG. 3 is a rear view of a door showing clamping point(s) of a door gripper according to the present invention.
Figure 4:
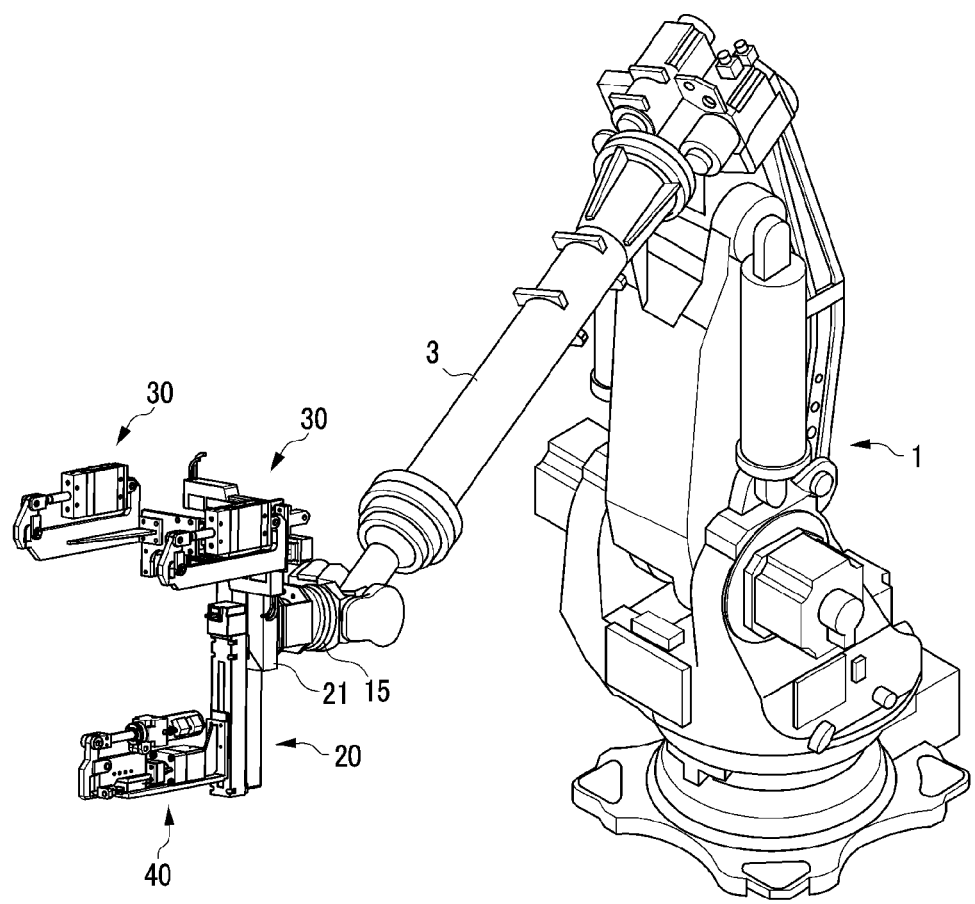
FIG. 4 is a perspective view showing a door gripper according to the present invention installed on a robot.
Figure 5:
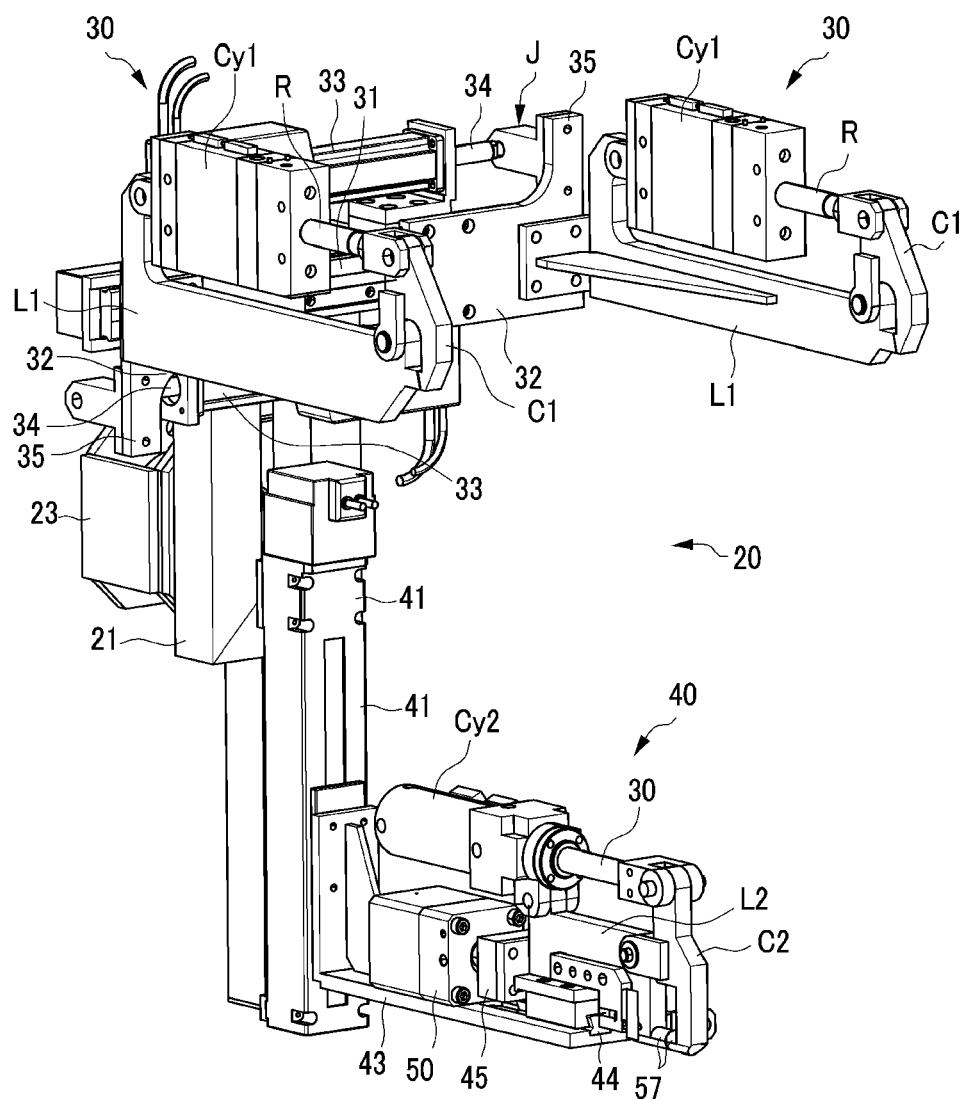
FIG. 5 is a perspective view of a door gripper of FIG. 4.
Figure 6:
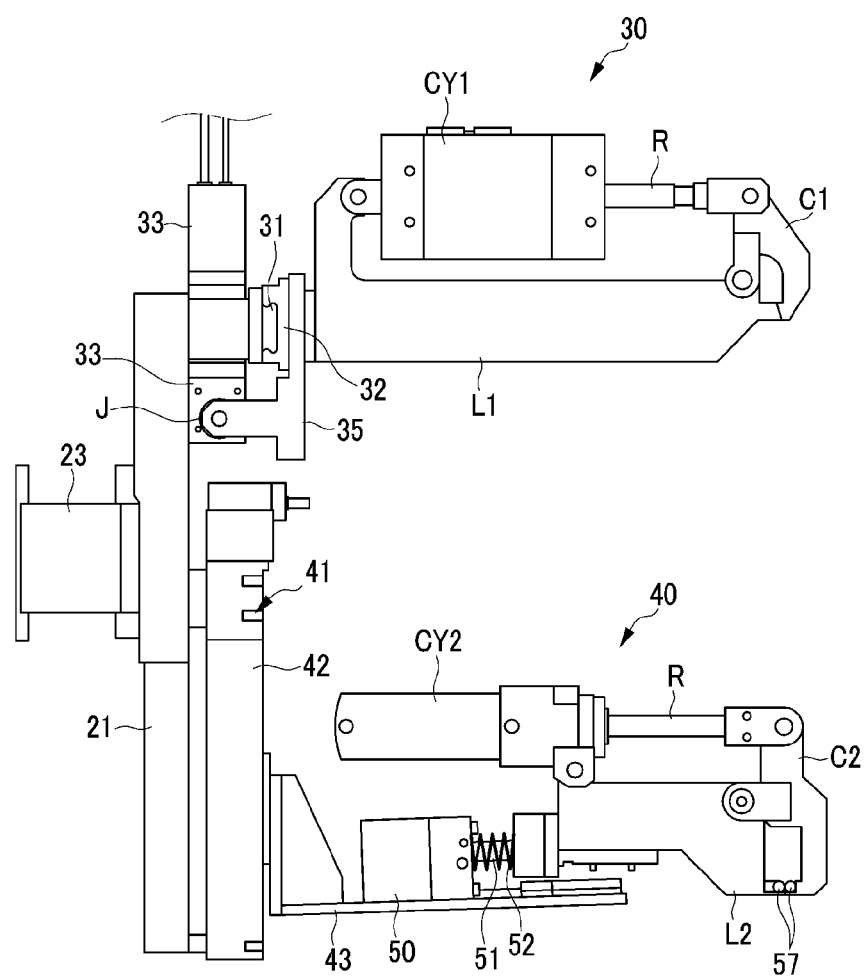
FIG. 6 is a side view of a door gripper of FIG. 4.

Now referring to FIGS. 3-6, there is shown a door gripper 20 according to particular aspects/embodiments of the present invention. In FIG. 3 there is shown a rear view of a door with the clamping point(s) for the door gripper 20 according to the present invention and FIG. 4 provides a perspective view showing a door gripper according to the present invention mounted or installed on a robot. FIGS. 5 and 6 are a perspective view and a side view respectively of a door gripper according to the present invention such as that shown in FIG. 4. Reference should be made to one of FIGS. 3-6 in the following discussion.

As shown in FIG. 3, a door 9 for use with a door gripper 20 of the present invention includes upper and lower clamping points P1 and P2 at both sides of the upper portion of an inner panel 11 and the lower center of an opening 13, on the rear side of the door.

The door gripper 20, as shown in FIG. 4, is configured so as to include a matting or mounting structure at the rear of a frame 21 that is configurable so as to be attached to a tool changer 15 such as is known to those skilled in the art that is disposed at the end of the arm 3 of the robot 1.

The door gripper 20, as shown in FIG. 5 and FIG. 6, includes a frame 21, upper clamping units 30 at both sides, and a lower clamping unit 40.

As indicated above, the frame 21 is configurable so as to include a tool mounting portion 23 at the center of the rear side. This tool mounting portion 23 mounts to the tool changer 15 of the robot 1 as described herein.

The upper clamping units 30 are mounted by transverse sliding plates 32 on a transverse guide rail 31 provided transversely at the upper portion of the frame 21 to be transversely slidable by transverse electric cylinders 33, respectively. In alternative embodiments, indexing electric motors as is known to those skilled in the art are used for the transverse electric motors. In other words the respective electric cylinders separately move the respective clamping unit transversely to adapt for differing spatial locations of the corresponding upper clamping points of a door. The upper clampers C1 restrict the clamping points P1 at both side of the upper portion of the door 9 with respect to upper locators L1, when the upper clamping cylinders CY1 are operate.

In further embodiments, the transverse guide rail 31 is transversely disposed at the upper portion of the frame 21.

Also, the transverse sliding plates 32 are slidably disposed at the left and right sides of the transverse guide rail 31.

Further, the transverse electric cylinders 33 are transversely disposed above and under the transverse guide rail 31 at the upper portion of the frame 21. The ends of operating rods 34 of the electric cylinders are connected to extending ends 35 of the transverse sliding plates 32.

Figure 7:
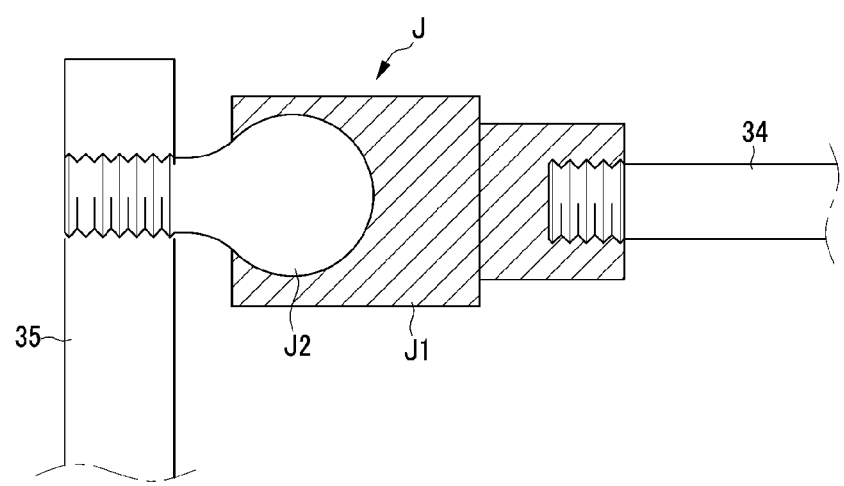
FIG. 7 is a cross-sectional view of a floating joint for a door gripper according to the present invention.

In further embodiments and with reference also to FIG. 7, the ends of the operating rods 34 of the transverse electric cylinders 33 are connected to the extending ends 35 of the transverse sliding plates 32 by floating joints J, as shown in FIG. 7, to remove load applied to the transverse electric cylinders 33, when the operating rods 34 of the transverse electric cylinders 33 are not aligned with the transverse guide rail 31.

Such a floating joint J is arranged such that a rotary ball J2 fixed to the extending end 35 of the transverse sliding plate 32 is positioned rotatably in a joint housing J1 connected to the end of the operating rod 34 of the transverse electric cylinder 33.

Also, the upper locator L1 is located forward on the transverse sliding plate 32 and the upper clamping cylinder CY1 is located in the front-rear direction above the upper locator L1, with the rear end hinged to the upper locator L1.

In addition, the upper clamper C1 is hinged at one side to the end of the upper locator L1 and the other side of the upper clamper C1 is hinged to the end of a rod R of the upper clamping cylinder CY1.

In further embodiments, the upper clamping cylinder CY1 is a hydraulic cylinder such as those known to those skilled in the art that is operated using a pressurized fluid. Preferably, the upper clamping cylinder CY1 is a pneumatic cylinder that uses pressurized air or other gas as the operational pressure for operating the cylinder.

In yet further embodiments, the lower clamping unit 40 includes a longitudinal sliding plate 43 movable up/down by a longitudinal electric cylinder 41 disposed longitudinally at the lower portion of the frame 21. The lower clamping unit also is movable forwardly/rearwardly by an air brake 50 on the longitudinal sliding plate 43. A lower clamper C2 restricts the lower clamping point P2 of the door 9 with respect to the lower locator L2 by driving the lower clamping cylinder CY2.

In more particular embodiments of the lower clamping unit 40, the longitudinal electric cylinder 41 is longitudinally disposed at the center under the frame 21.

The longitudinal sliding plate 43 is disposed so as to be guided up/down along the a cylinder case 42 of the longitudinal electric cylinder 41 and connected with an operating rod (not shown) of the longitudinal electric cylinder 41 inside the cylinder case 42 to receive up-down driving force.

The air brake 50 is arranged in the front-rear direction on the longitudinal sliding plate 43 and a sliding block 45 is located on the longitudinal sliding plate 43 so as to be movable along a front-rear guide rail 44.

In further embodiments, the rear side of the sliding block 45 is connected to the operating rod 51 of the air brake 50 to be fixed or released on the front-rear guide rail 44. Also, a spring 52 that provides elastic force to the front of the sliding block 45 is arranged on the operating rod 51 of the air brake 50 to push the sliding block 45 forward while the air brake 50 does not operate.

In further embodiments, the lower locator L2 is mounted to the front of the sliding block 45 so as to be movable forward/rearward with the sliding block 45. A lower clamping cylinder CY2 is arranged in the front-rear direction above the lower locator L2, where one side is hinged to the lower locator L2.

In further embodiments, one side of the lower clamper C2 is hinged to the end of the lower locator L2 and the other side of the lower clamper C2 is hinged to the end of the rod R of the lower clamping cylinder CY2 to be hinge-operated with respect to the end of the lower locator L2 when the lower clamping cylinder CY2 operates.

In yet further embodiments, the lower clamping cylinder CY2 is a hydraulic cylinder such as those known to those skilled in the art that is operated using a pressurized fluid. Preferably, the lower clamping cylinder CY2 is a pneumatic cylinder that uses pressurized air or other gas as the operational pressure for operating the cylinder.

Figure 8:
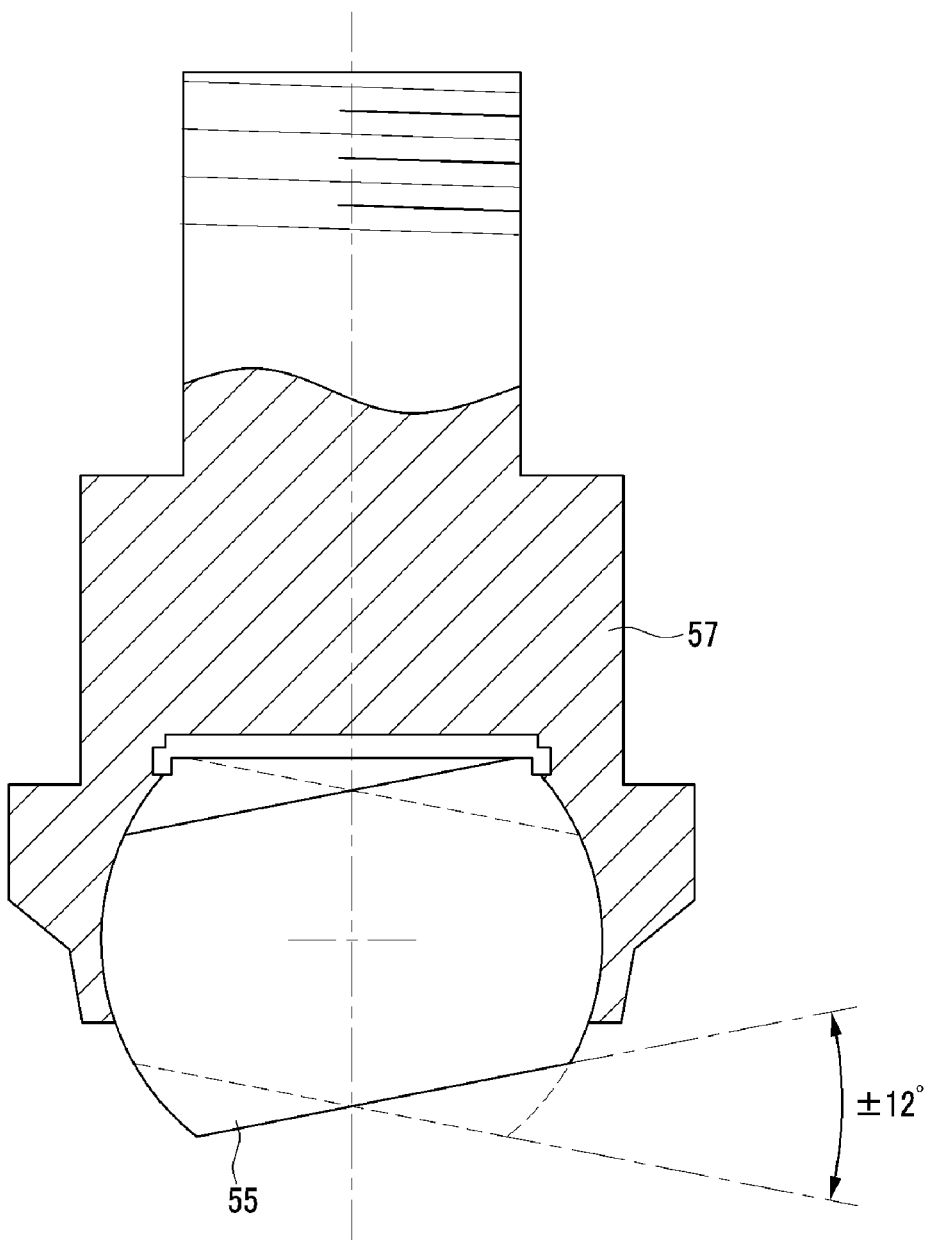
FIG. 8 is a cross-sectional view of a rotary pad for a door gripper according to the present invention.

In yet further embodiments and with reference also to FIG. 8, rotary pad 57 with a swivel ball 55 rotatable within about 12° is provided in the restricted surfaces of the lower clamper C2 and the lower locator L2, to deal with an angle difference of the restricted surfaces.

Figure 9:
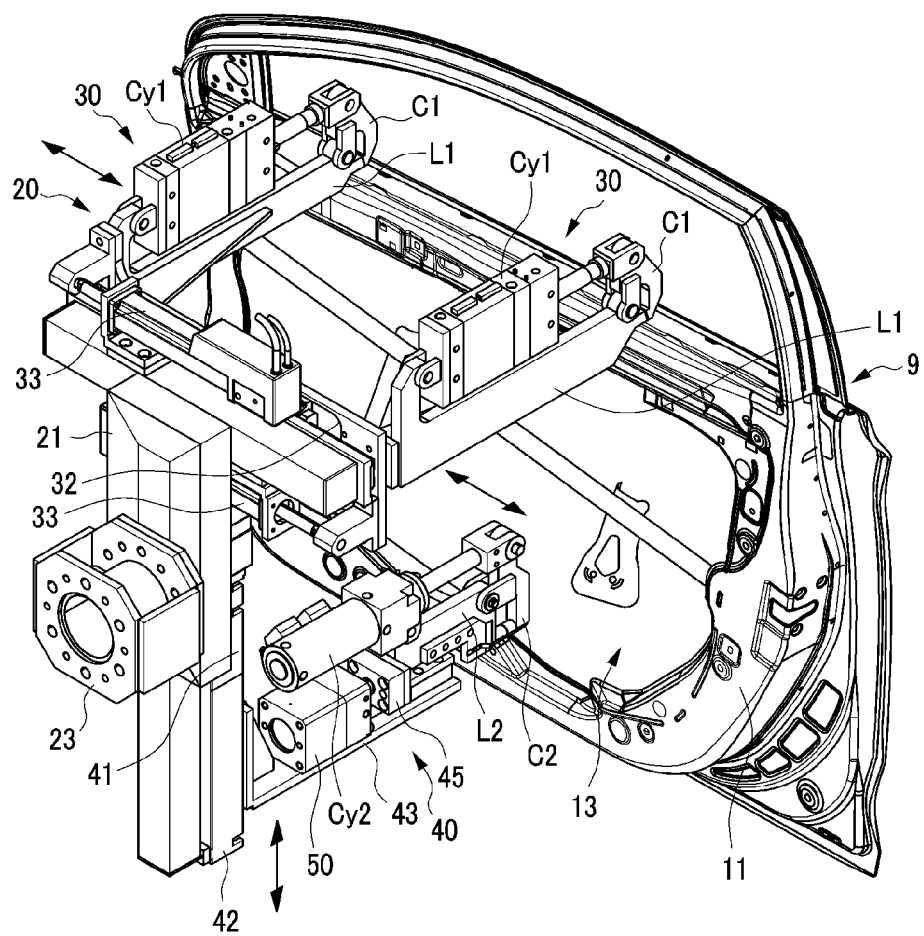
FIG. 9 is a perspective view showing a door gripper according to the present invention when clamped to a door.

As shown in FIG. 9, for a door gripper 20 as described herein as the upper clamping cylinders CY1 of the upper clamping units 30 operates, the upper locators L1 and the upper clampers C1 clamp and restrict the upper clamping points P1 of the inner panel 11 of the door 9. Also, as the lower clamping cylinder CY2 of the lower clamping unit 40 operates, the lower locator L2 and the lower clamper C2 clamps and restricts the lower clamping point P2 of the lower center of the opening 13 in the inner panel 11 of the door 9.

Such a door gripper of the present invention is advantageous as when the specifications of the door 9 change, the door gripper 20 of the present invention can be easily reconfigured or adapted for such use. In particular the door gripper of the present invention deals with a width difference by operating the transverse electric cylinders 33 to adjust the distance between the upper clamping units 30, correspond to the width of the upper clamping points P1, and also deals with a height difference by operating the longitudinal electric cylinder 41 to adjust the up-down position of the lower clamping unit 40 with respect to the upper clamping units 30, corresponding to the height of the upper clamping points P1 and the lower clamping point P2.

Figure 10:
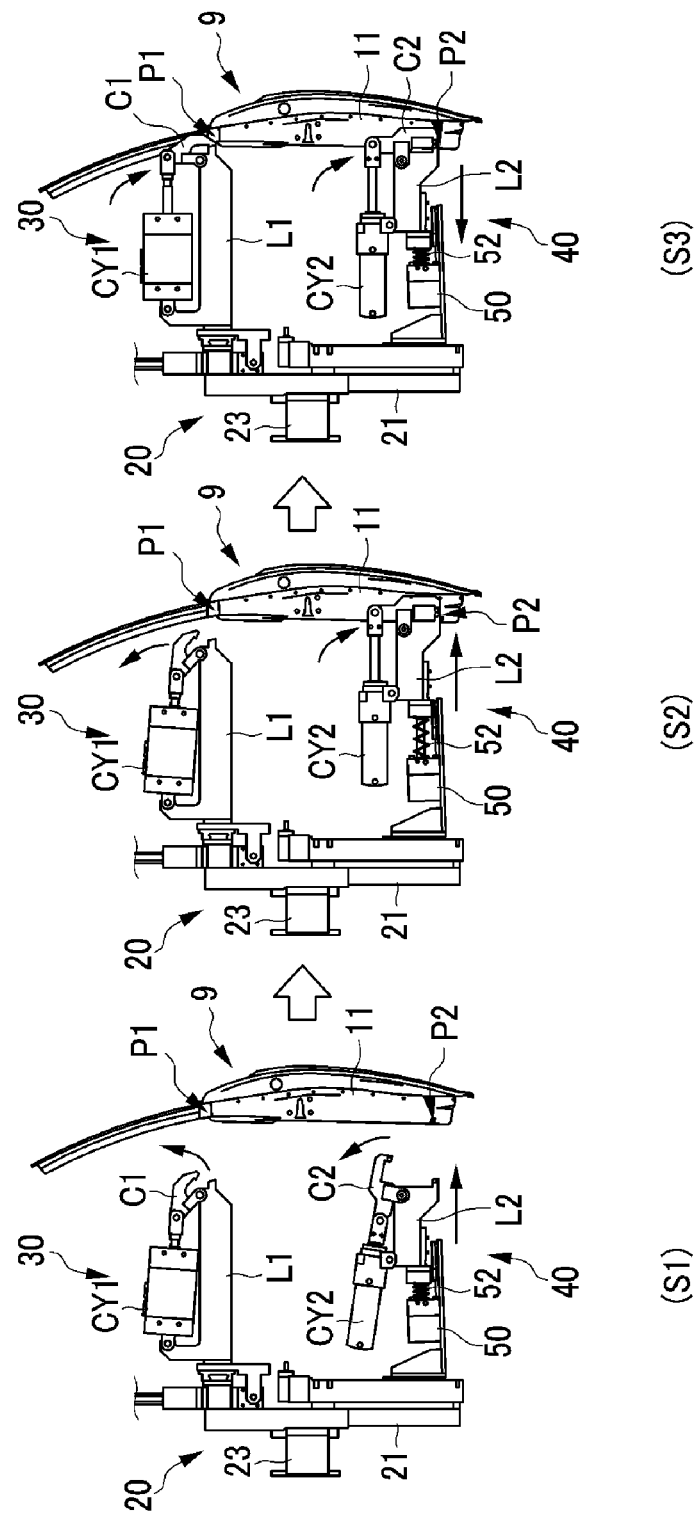
FIG. 10 is an illustrative view showing steps S1-S3 of a manufacturing operation using a door gripper according to the present invention.

The operation for each step of the door gripper 20 in an exemplary manufacturing process is described below with reference to FIG. 10. Initially, the door gripper 20 is positioned to correspond to the rear side of the door 9 by operating the robot 1 (S1). In other words, the door gripper is positioned proximal to the door of the vehicle so the door gripper can be thereafter clamped to the door.

Next in the operation or manufacturing process, the air brake 50 is released and the lower clamper C2 is moved forward by the elastic force of the spring 52. As the door gripper 20 continues being moved by the robot 1, the rotary pad 57 on the lower locator L1 matches with the lower clamping point P2 of the door inner panel, and as the lower clamping cylinder CY2 operates, the lower clamper C2 clamps the lower clamping point P2 at the lower center of the opening 13 in the door inner panel 11, together with the lower locator L2 (S2).

Thereafter, when the locators L1 of the upper clamping units 30 reach the upper clamping points P1 at both sides of the door inner panel 11 by continuous operation of the robot 1, the door gripper 20 is stopped by stopping the robot.

The air brake 50 absorbs the movement of the robot until the locators L1 of the upper clamping units 30 reaches the upper clamping points P1 at both sides of the door inner panel 11. Then as the air brake 50 operates and fixes the position of the lower clamping unit 40, the whole clamping points P1 and P2 on the door 9 are restricted (S3).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A door gripper for a vehicle comprising:
a frame having a tool mounting portion at a center of a rear side to mount a tool changer of a robot;
upper clamping units mounted by transverse sliding plates on a transverse guide rail provided transversely at an upper portion of the frame to be transversely slidable by transverse electric cylinders, respectively, and having upper clampers restricting clamping points at both sides of an upper portion of a door with respect to an upper locator, when upper clamping cylinders operate;
a lower clamping unit having a longitudinal sliding plate to be movable up/down by a longitudinal electric cylinder disposed longitudinally at a lower portion of the frame, moved forward/rearward by an air brake on the longitudinal sliding plate, and restricting one side of a lower portion of the door with respect to a lower locator by driving a lower clamping cylinder, using a lower clamper; and
wherein the upper clamping units further include:
the transverse guide rail transversely disposed at the upper portion of the frame;
the transverse sliding plates slidably disposed at one side and the other side of the transverse guide rail;
the transverse electric cylinders transversely disposed at the upper portion of the frame above and under the transverse guide rail and having operating rods with ends connected to extending ends of the transverse sliding plates;
the upper locators disposed forward at the transverse sliding plates;
the upper clamping cylinders disposed in the front-rear direction at the upper portions of the upper locators and having rear ends hinged to the upper locators;
the upper clampers having sides hinged to ends of the upper locators and other sides hinged to an end of a rod of the upper clamping cylinders.

2. That door gripper for a vehicle of claim 1, wherein:
ends of operating rods of the transverse electric cylinders are connected to extending ends of the transverse sliding plates by floating joints.

3. The door gripper for a vehicle of claim 1, wherein:
the upper clamping cylinders are pneumatic cylinders using air pressure as the operational pressure.

4. The door gripper for a vehicle of claim 1, wherein: the lower clamping unit includes:
the longitudinal electric cylinder disposed longitudinally at a lower center of the frame;
the longitudinal sliding plate connected with an operating cylinder of the longitudinal electric cylinder to be guided up/down along a cylinder case;
the air brake disposed in the front-rear direction on the longitudinal sliding plate;
a sliding block disposed slidably along a front-rear guide rail on the longitudinal sliding plate and having a rear side connected to an operating rod of the air brake;
the lower locator mounted to the front of the sliding block to be movable forward/rearward with the sliding block;
the lower clamping cylinder disposed in a front-rear direction above the lower locator and having one side hinged to the lower locator; and
the lower clamper having one side hinged to an end of the lower locator and another side hinged to an end of a rod of the lower clamping cylinder.

5. The door gripper for a vehicle of claim 4, wherein:
the lower clamping cylinder is a pneumatic cylinder using air pressure as the operational pressure.

6. The door gripper for a vehicle of claim 4, wherein:
a spring providing elastic force to a front of the sliding block is disposed on an operating rod of the air brake.

7. The door gripper for a vehicle of claim 4, wherein:
a rotary pad with a swivel ball rotatable within a predetermined range of angle is provided in restricted surfaces of the lower clamper and the lower locator.

8. The door gripper for a vehicle of claim 7, wherein:
the predetermined range of angle is 12°.

9. A door gripper for a vehicle comprising:
a frame;
at least one upper clamping unit being movably coupled to the frame so an end point thereof is movable transversely with respect to the frame;
wherein said at least one upper clamping unit includes at least one upper clamper and an upper locator, the at least one clamper restricting clamping points at a corresponding upper portion of a door with respect to the upper locator;
at least one lower clamping unit that is movable coupled to the frame so an end point thereof is movable at least one of back and forth in a first direction or back and forth in a second direction;
wherein said at least one lower clamping unit includes at least one lower clamper and a lower locator, the at least one clamper restricting a clamping point at a corresponding lower portion of a door with respect to the lower locator;
the frame includes a transverse guide rail provided transversely at an upper portion of the frame;
the upper clamping unit includes at least one transverse sliding plate, at least one transverse moving device, and a least one damper actuation device;
each of the at least one transverse sliding plate is mounted on the transverse guide rail and configured so as to be transversely slidable by the at least one transverse moving device; and
the at least one clamper actuation device is operably coupled to the at least one clamper, the actuation device being configured so as to cause the clamper to engage the door at a corresponding clamping point when restricting the clamping point.

10. The door gripper of claim 9, wherein the frame includes a mounting portion that is configured and arranged to mount a tool changer of a robot.

11. The door gripper of claim 9, wherein:
the lower clamping unit includes a longitudinal sliding plate, a longitudinal moving device that is disposed longitudinally at a lower portion of the frame, an air brake on the longitudinal sliding plate, and a lower clamper actuation device,
the longitudinal sliding plate is movable back and forth in a first direction by the longitudinal moving device,
the clamper is moved back and forth by the air brake on the longitudinal sliding plate, and
the lower clamper actuation device being operably coupled to the lower clamper and being configured and arranged so as to restrict one side of the lower portion of the door with respect to the lower locator by using the lower clamper.

12. The door gripper of claim 9, wherein:
the at least one clamping unit includes a rotary pad with a swivel ball rotatable within a predetermined range of angle, said rotary pad being provided in restricted surfaces of the lower clamper and the lower locator.

13. The door gripper of claim 9, including a plurality of upper clamping units each being transversely movable with respect to the frame.

* * * * *